(No Model.)
G. H. N. CORTTISS.
WHEEL FOR VEHICLES.
No. 260,744. Patented July 11, 1882.
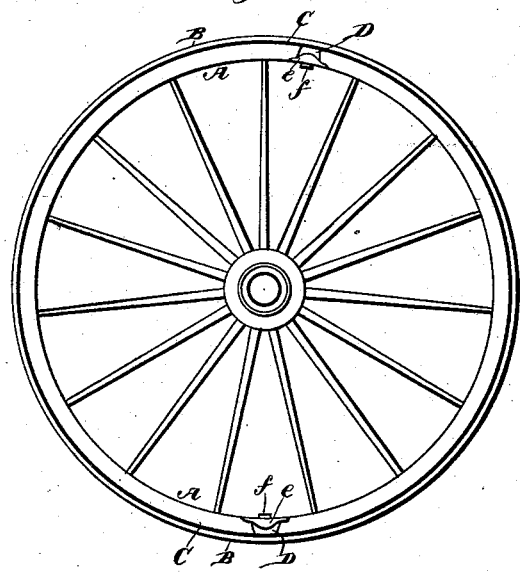
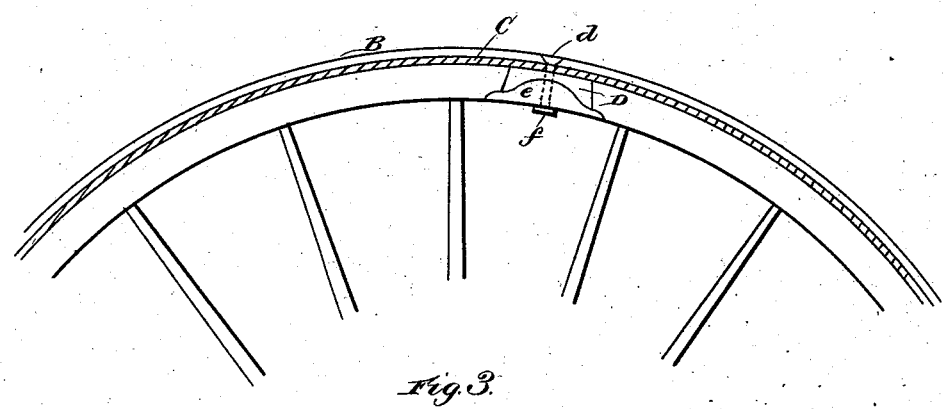
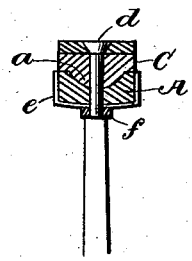
Witnesses
L. L. Tilden
W. B. Tilden
Inventor.
George H. N. Corttiss
By Chas. B. Tilden
atty.

United States Patent Office.

GEORGE H. N. CORTTISS, OF WILSONVILLE, CONNECTICUT, ASSIGNOR TO HIMSELF AND JAMES RILEY, OF NASHUA, NEW HAMPSHIRE.

WHEEL FOR VEHICLES.

SPECIFICATION forming part of Letters Patent No. 260,744, dated July 11, 1882.

Application filed September 30, 1881. (No model.)

*To all whom it may concern:*

Be it known that I, GEORGE H. N. CORTTISS, of Wilsonville, in the county of Windham and State of Connecticut, have invented certain new and useful Improvements in the Construction of Wheels for Vehicles, of which the following is a specification.

My invention relates to a certain novel method of setting the metal tires upon wheels, whereby the tire is set cold and is so firmly secured as to avoid all necessity of resetting, while at the same time the wear of the wooden portion of the wheel is prolonged and the action of the wheel is greatly improved in use.

My invention is illustrated in the accompanying drawings, in which Figure 1 is an elevation of a carriage-wheel in which my invention is embodied. Fig. 2 is an elevation upon a larger scale of a section of the wheel, showing the tire set. Fig. 3 is a cross-section of Fig. 2, taken in the plane $x\ x$.

A in said drawings indicates the felly or rim of the wheel, and B the tire. The latter is made in the usual manner, and is of such a size that when it is placed upon the wheel a suitable space is left between it and the periphery of the felly for the elastic cushion C. In an ordinary carriage-wheel this space may vary from one-fourth to three-eighths of an inch in width or thickness—that is to say, between the felly and the tire.

Upon the periphery or rim of the wheel A, and extending completely around the same, I form a half-round channel or groove, as shown in section in Fig. 3. This channel may occupy three-fourths of the entire width of the felly A; or, if desired, it may be of somewhat less dimension. C is an elastic annulus or cushion, preferably constructed of rubber, and having such a size relatively to the dimensions of the wooden portion of the wheel that when slipped upon the felly the cushion C will be somewhat distended and made to closely embrace the rim of the wheel. Upon the inner surface of the annulus or cushion C is formed a half-round rib, $a$, (see Fig. 3,) of a size to exactly fill the half-round channel in the felly. When the cushion C is placed upon the rim A of the wheel the elasticity of the rubber draws the rib $a$ snugly down into the channel in the felly, which serves to retain the cushion in place.

As I have already mentioned, the tire B is of such dimension that its diameter inside is less than the outside diameter of the wheel when the rubber cushion is mounted thereon. It follows therefore that when the tire is set it will compress the elastic cushion C between it and the felly. As it requires great force to effect the proper degree of compression, I prefer to expand the wooden rim of the wheel after the cushion C and tire B have been placed thereon. I accomplish this in the manner following: A block or section, D, is cut out from the felly A, (see Fig. 2,) having its ends mitered or beveled, as shown, and with the ends of the felly mitered to fit against the ends of the block D. The block and felly are beveled in such a manner that the former enters upon the inner side of the felly and is driven or forced toward the outside of the wheel, thereby expanding the rim by spreading the two parts of the felly A or forcing them laterally apart. As the block D is preferably beveled at a small angle, in order that it may act with greater power, it may be necessary to use two of such blocks, as shown in Fig. 1, one block upon each side of the wheel. I do not, however, limit myself to any specified number, as in some cases two, three, or more blocks may be used in the same manner. The block D is held in place by a bolt, $d$, and felly-plate $e$. The outer extremity of the bolt is upset upon the surface of the tire B and its body passes through the cushion C and block D, the threaded end of the bolt projecting through the plate $e$ to receive a nut, $f$, by which the plate is drawn closely up to the block and the block itself driven into position and held there, the sides of the plate $e$ being bent upward to embrace the vertical faces of the block D and felly A, thereby preventing all possibility of displacement when the wheel is in use.

In order to bind the tire in place still more securely, I bolt through it to the felly in the usual manner.

The tire is set in the following manner: The blocks D are first removed and the elastic cushion C is drawn upon the wheel, the withdrawal of the blocks allowing sufficient contraction of the rim to effect this easily. The tire B is then forced on over the cushion and accurately adjusted in place. The blocks D are now replaced and driven in as far as possible, after which the bolts $d$ are inserted, the felly-plates $e$ adjusted, and the nuts $f$ turned up, thereby drawing the blocks D completely into place and completing the operation.

The expansion of the rim A compresses the cushion C powerfully, diminishing its thickness and slightly increasing its breadth. For this reason the cushion is constructed of a breadth a little less than the width of the felly, so that when the tire is set the edges of the cushion will be flush with the edges of the tire.

A wheel having its tire set in this manner will run with much less noise and rattle, and will outwear a wheel having the tire set in any other way. Moreover, the tire will, under ordinary circumstances, never require resetting, but will remain in place until it wears out. The expansions and contractions of the wooden portion of the wheel, caused by changes in the atmosphere and temperature, will be compensated by the elasticity of the cushion, which will yield to any expansion of the wheel and will expand again when the wheel contracts, the degree of compression to which it is subjected not being such as to impair its resilient qualities.

I do not broadly claim a rubber cushion interposed between the tire and felly of a vehicle-wheel, as such, of itself, is not new.

My improvements consist in the novel combination and arrangement of parts hereinbefore set forth, and which are specifically set forth in the claim.

Having thus fully described my invention, what I claim, and desire to secure by Letters Patent of the United States, is—

In a vehicle-wheel, the combination, substantially as herein described, of the sectional felly A, having an annular channel, the block D, having united or beveled ends and interposed between the adjacent ends of the felly, the cushion C, having a rib, $a$, arranged in the channel of the felly, the tire B, and the bolt $d$, extending transversely through the several parts, and having a nut acting on the mitered or beveled block to expand the fellies and compress the cushion, as and for the purpose set forth.

In testimony whereof I have signed my name to this specification in the presence of two subscribing witnesses.

GEORGE HENRY NEWTON CORTTISS.

Witnesses:
DANIEL ADAMS,
HENRY H. SMITH.